United States Patent
Twede

(10) Patent No.: US 7,076,518 B1
(45) Date of Patent: Jul. 11, 2006

(54) SYSTEM AND METHOD FOR LINKING A WEB SERVER IN A PERIPHERAL TO A NETWORK THROUGH A HOST

(75) Inventor: Roger S. Twede, Meridian, ID (US)

(73) Assignee: Hewlett-Packard Development Comapny, L.P., Houston, TX (US)

( * ) Notice: Subject to any disclaimer, the term of this patent is extended or adjusted under 35 U.S.C. 154(b) by 905 days.

(21) Appl. No.: 09/695,794

(22) Filed: Oct. 24, 2000

(51) Int. Cl.
*G06F 15/16* (2006.01)

(52) U.S. Cl. .................. 709/201; 709/217; 709/219; 709/229; 710/62

(58) Field of Classification Search ............... 709/203, 709/219, 227, 228, 231, 201, 229, 217; 710/62
See application file for complete search history.

(56) References Cited

U.S. PATENT DOCUMENTS

| | | | |
|---|---|---|---|
| 5,323,393 A * | 6/1994 | Barrett et al. | 370/449 |
| 5,699,494 A * | 12/1997 | Colbert et al. | 358/1.15 |
| 5,901,286 A * | 5/1999 | Danknick et al. | 709/203 |
| 6,067,558 A * | 5/2000 | Wendt et al. | 709/202 |
| 6,092,078 A * | 7/2000 | Adolfsson | 707/102 |
| 6,148,346 A * | 11/2000 | Hanson | 719/321 |
| 6,209,048 B1 * | 3/2001 | Wolff | 710/62 |
| 6,446,192 B1 * | 9/2002 | Narasimhan et al. | 712/29 |
| 6,473,788 B1 * | 10/2002 | Kim et al. | 709/209 |
| 6,560,641 B1 * | 5/2003 | Powderly et al. | 709/219 |
| 6,636,853 B1 * | 10/2003 | Stephens, Jr. | 707/10 |

FOREIGN PATENT DOCUMENTS

| | | |
|---|---|---|
| EP | 0598502 A1 | 4/1998 |
| EP | 0872792 A2 | 10/1998 |
| EP | 0923024 A2 | 11/2004 |
| WO | WO 98/39656 A1 | 12/1996 |
| WO | WO 97/30554 A2 | 8/1997 |
| WO | WO 00/58902 A1 | 10/2000 |

\* cited by examiner

*Primary Examiner*—Frantz B. Jean

(57) ABSTRACT

A system and method are provided in a host and in a peripheral for providing network access to a web server in the peripheral device, where the peripheral device is locally coupled to the host. The web server in the peripheral includes web pages that provide access to the control functions of the peripheral. Users may access the control functions of the peripheral through the use of a browser, thereby avoiding the need for special control access software. In one embodiment, the system includes a processor coupled to a local interface and a memory coupled to the local interface. The system also includes listener logic stored on the memory and executable by the processor. The listener logic comprises logic to identify a request from a client received by the host via a network to be forwarded to the web server located on the peripheral device locally coupled to the host, logic to forward the request to the web server on the peripheral device, and logic to transmit a response received from the web server to the client.

20 Claims, 3 Drawing Sheets

SYSTEM AND METHOD FOR LINKING A WEB SERVER IN A PERIPHERAL TO A NETWORK THROUGH A HOST

TECHNICAL FIELD

The present invention is generally related to the field of data communications and, more particularly, is related to a system and method for linking a web server in a peripheral to a network through a host.

BACKGROUND OF THE INVENTION

Networks are becoming a basic tool employed by businesses and other organizations to handle information. Specifically, many individuals working at a specific organization may employ computer systems that are linked to each other via a network. A typical network allows users to transmit information to peripherals linked to the network to accomplish various tasks such as copying, printing, etc. Often such users may also employ peripherals that are locally linked to their individual computers in addition to those peripherals that are linked directly to the network. In some cases, other users may desire network access to peripherals that are locally connected to a specific computer. Unfortunately, for peripherals that are linked locally to a computer on a network, users typically can not access the control functions of the locally connected peripheral to specify various attributes, etc., that can guide the operation of the peripheral in performing a specific task.

SUMMARY OF THE INVENTION

In light of the foregoing, a system and method are provided in a host and in a peripheral for providing network access to a web server in the peripheral device where the peripheral device is locally coupled to the host. The web server in the peripheral includes web pages that provide access to the control functions of the peripheral. Users may access the control functions of the peripheral through the use of a browser, thereby avoiding the need for special control access software. In one embodiment, the system includes a processor coupled to a local interface and a memory coupled to the local interface. The system also includes listener logic stored on the memory and executable by the processor. The listener logic comprises logic to identify a request from a client received by the host via a network to be forwarded to the web server located on the peripheral device locally coupled to the host, logic to forward the request to the web server on the peripheral device, and logic to transmit a response received from the web server to the client.

The present invention may also be viewed as a method for providing network access to a web server in a peripheral device. The present method comprises the steps of: identifying a request from a client received by a host via a network to be forwarded to the web server located on the peripheral device locally coupled to the host, forwarding the request to the web server on the peripheral device, and transmitting a response received from the web server to the client.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
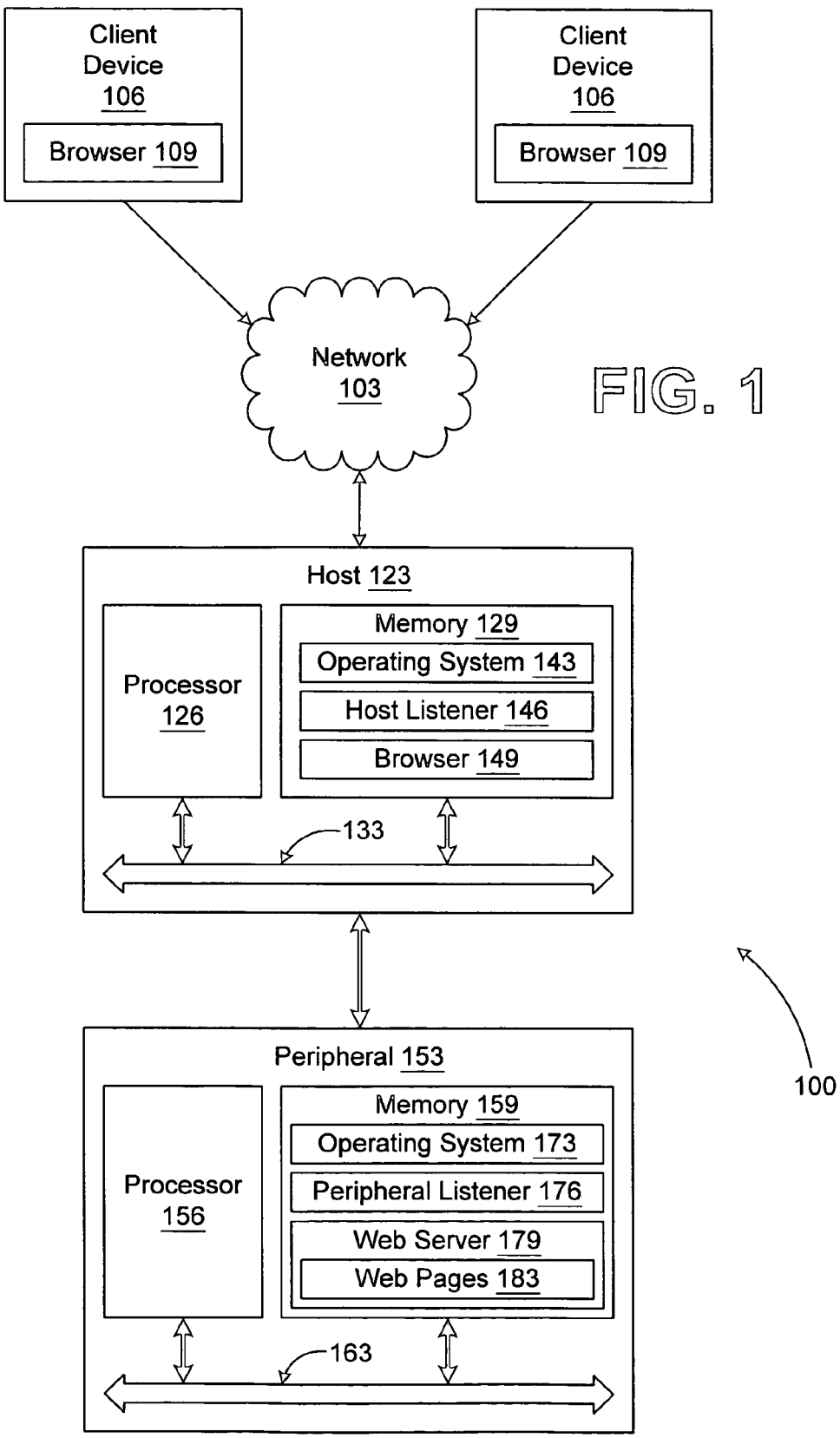
FIG. 1 is a block diagram of a peripheral access system according to an embodiment of the present invention.

Turning to FIG. 1, shown is a peripheral access system 100 that serves to provide access to a peripheral through a host computer system. This is accomplished using hypertext transfer protocol (HTTP) to provide browser access to peripheral functions through the host computer system, as will be described.

The peripheral access system 100 includes a network 103 that may be, for example, the Internet, a wide area network, a local area network, a wireless network, or other suitable network, as well as any combination of two or more of these networks. One or more client devices 106 are coupled to the network 103. The client devices 106 may be, for example, computer systems or other network elements, as generally known by those with ordinary skill in the art. The client devices 106 each include, for example, a browser 109. The browsers 109 provide access to web servers via the network 103, as is generally understood by those with ordinary skill in the art.

The peripheral access system 100 also includes a host 123 that is coupled to the network 103. The host 123 may be, for example, a computer system or other network element. The host 123 includes, for example, a processor 126 and a memory 129, both of which are coupled to a local interface 133. The local interface 133 may be, for example, a data bus with an accompanying control bus, as is generally understood by those with ordinary skill in the art. The processor 126, memory 129, and the local interface 133 make up a processor circuit, as is generally understood by those with ordinary skill in the art. Stored on the memory 129 and executable by the processor 126 are an operating system 143, a host listener 146, and a browser 149. A peripheral 153 is coupled to the host 123 by way of a parallel connection through a parallel port in the host 123 or a universal serial bus (USB). The physical connection between the host 123 and the peripheral 153 may be also accomplished by way of another linkage as is generally known by those with ordinary skill in the art. The peripheral 153 may be, for example, a printer, scanner, copy machine, multi-function peripheral, or other device.

The peripheral 153 may be, for example, a printer, copy machine, scanner, multi-function peripheral, or other device. The peripheral 153 includes, for example, a processor 156 and a memory 159, both of which are coupled to a local interface 163. The local interface 163 may comprise, for example, a data bus with accompanying control bus, as is generally known by those with ordinary skill in the art. Together the processor 156, the memory 159, and the local interface 163 make up a processor circuit as is generally known by those with ordinary skill in the art. Stored on the memory 159 and executable by the processor 156 are an operating system 173, a peripheral listener 176 and a web server 179. The web server 179 also includes one or more web pages 183 that provide access to the functionality of the peripheral 153. Specifically, the web pages 183 provide browser access to the control functions of the peripheral 153 so that the peripheral 153 may be remotely manipulated by a particular user across the network 103.

The memories 129 and 159 may include, for example, both volatile and nonvolatile memory components. Volatile components are those that do not retain data values upon loss of power. Nonvolatile components are those that retain data upon a loss of power. Thus, the memories 129 and 159 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

In addition, the processors 126 and 156 may each represent multiple processors and the memories 129 and 159 may represent multiple memories that operate in parallel. In such a case, the local interfaces 133 and 163 each may be an appropriate network that facilitates communication between any two of the multiple processors or between any processor and any of the memories, etc. The local interfaces 133 and 163 may facilitate memory to memory communication as well. The processors 126 and 156, memories 129 and 159, and local interfaces 133 and 163 may comprise, for example, electrical or optical components or a combination of electrical and optical components.

Next, a discussion of the operation of the peripheral access system 100 is provided. The peripheral access system 100 assumes that the web pages 183 provide control access to the peripheral 153. In particular, the web pages 183 may include, for example, control information such as the ability to manipulate the number of copies or pages to be printed, the number of print jobs, copy jobs, and/or scanning jobs waiting in a queue to be executed, the lightness or darkness of documents to be printed and/or copied, a paper size selection mechanism, or a selector to determine whether or not documents copied and/or printed should be sorted accordingly. In addition, the control access to the peripheral 153 may include access to information regarding the status of the peripheral 153. Such status information may include, for example, a number of documents to be printed, copied, or scanned; operational status of the peripheral; or other status information. Access to the control functions and/or status information of a peripheral 153 is not limited to those items listed above, where other control functions and/or status information are included herein within the scope of the present invention.

To describe the operation of the peripheral access system 100, let us assume that the peripheral 153 is a printer, for example, to which a user wishes to gain control access. In this regard, a user may gain the desired control access via the browser 109 in one of the client devices 106 or the browser 149 in the host 123. First, the user employs the browser 109/149 to access the web pages 183 by sending a request to the host 123 that includes the appropriate uniform resource locator (URL) that identifies the host 123 and is associated with one of the web pages 183. Note that if it is the browser 149 that is manipulated, the URL simply points back to the host 123 in which the browser 149 is executed. The request includes a port identifier in the URL that is associated with a virtual socket in the host 123 that is dedicated for data traffic to be sent to the web server 179 in the peripheral 153.

Meanwhile, upon startup of the host 123 or at some later time during the operation of the host 123, the host listener 146 registers with the operating system 143 to set up the virtual socket to receive all data traffic with the previously mentioned port identifier. Consequently, upon receiving data traffic from one of the browsers 109/149 with the port identifier, the operating system 143 hands it off to the host listener 146. When a request is received by the host listener 146 for the web server 179, the host listener 146 then opens a channel connection to the peripheral 153 through a direct input/output (I/O) port. The direct I/O port may be, for example, a parallel port or a universal serial bus port, etc., depending upon which type of connection is employed to link the peripheral 153 to the host 123. The host listener 146 then passes on the request to the peripheral 153 over the channel connection. This is done, for example, by including a channel identifier in the request that is dedicated to the web server 179.

When the request reaches the peripheral 153, the operating system 173 reacts to the channel identifier included in the request and passes it on to the peripheral listener 176. The operating system 173 in the peripheral 153 knows to send the request to the peripheral listener 176 as the peripheral listener 176 registers with the operating system 173 to receive all data traffic associated with the channel. Note that the operating system 173 may be much simpler in scope from the operating system 143 as there may be fewer control functions addressed by the operating system 173 in the peripheral 153 as compared with the host 123.

The peripheral listener 176 then passes on the request to the web server 179 that reacts to the request and generates an appropriate response. The response traces the same route as the request, only in the reverse direction and is ultimately transmitted by the operating system 173 to the browser 149 in the host 123 or to the browser 109 in the client device 106, depending on the origin of the request.

Figure 2:
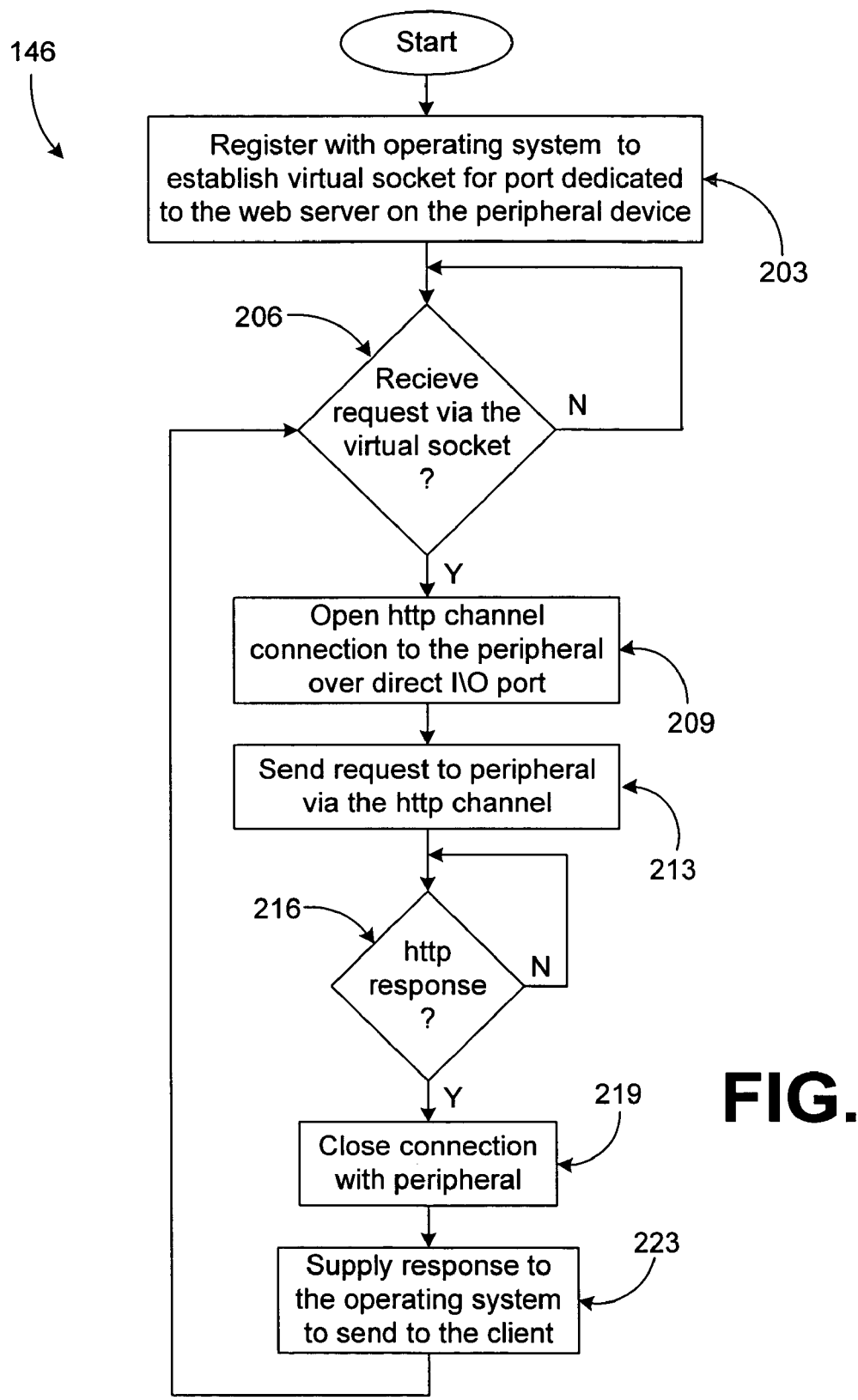
FIG. 2 is a flow chart of the logical function of a host listener in a host in the peripheral access system of FIG. 1.

With reference to FIG. 2, shown is a flowchart of the logic of the host listener 146 according to one aspect of the present invention. Alternatively, the flowchart of FIG. 2 may represent steps of a method implemented in the host 123 (FIG. 1). The host listener 146 generally acts to bridge a communications gap between the operating system 143 (FIG. 1) in the host 123 and the peripheral 153 (FIG. 1) that is coupled to the host 123 through a direct I/O port. Beginning with block 203, the host listener 146 registers with the operating system 173 to establish a virtual socket for a port dedicated to the web server 179 (FIG. 1) that resides on the peripheral 153. This may be done, for example, during a start-up phase of the host 123 or at another time during the operation of the host 123. Thereafter, the host listener 146 moves to block 206 in which it listens on the virtual socket to receive a request that is to be passed on to the peripheral 153 (FIG. 1).

Assuming a request is received, then the host listener 146 moves to block 209 in which a channel connection is opened to the peripheral 153 over a direct I/O port. The direct I/O port may be, for example, a parallel port, a universal serial bus (USB) port, or other port that are generally known by those skilled in the art. The channel connection that is opened is referred to as an "HTTP channel" given that the information exchange to and from the peripheral 153 involves the web server 179 that operates, for example, according to the HyperText Transfer Protocol. Other protocols may be used as well as is generally known by those with ordinary skill in the art. By opening the HTTP channel in block 209, the host listener 146 may then transmit a request to the peripheral 153 via the direct I/O port to determine if any mechanism is listening on the HTTP channel to ensure that it is valid for data transmission.

Once the HTTP channel is proven valid, then the host listener 146 moves to block 213 in which the request is transmitted to the peripheral 153 by way of the HTTP channel. Note that this involves placing a channel identifier in the request itself that can be identified by the operating system 173 and the peripheral 153. Thereafter, in block 216 the host listener 146 waits to receive an HTTP response from the peripheral 153 based upon the request. Assuming that an HTTP response is received, the host listener 146 then progresses to block 219 in which the channel connection to the peripheral 153 is closed by acknowledging receipt of the HTTP response. Then, in block 223, the HTTP response is supplied to the operating system 143 that, in turn, transmits the response to the client device 106 for display by the browser 109. Thereafter, the host listener 146 reverts back to block 206 to wait to receive the next request by way of the virtual socket. The host listener 146 generally passes on a single request to the peripheral 153 at a time, although it may be possible that multiple requests be supplied to the peripheral 153.

Figure 3:
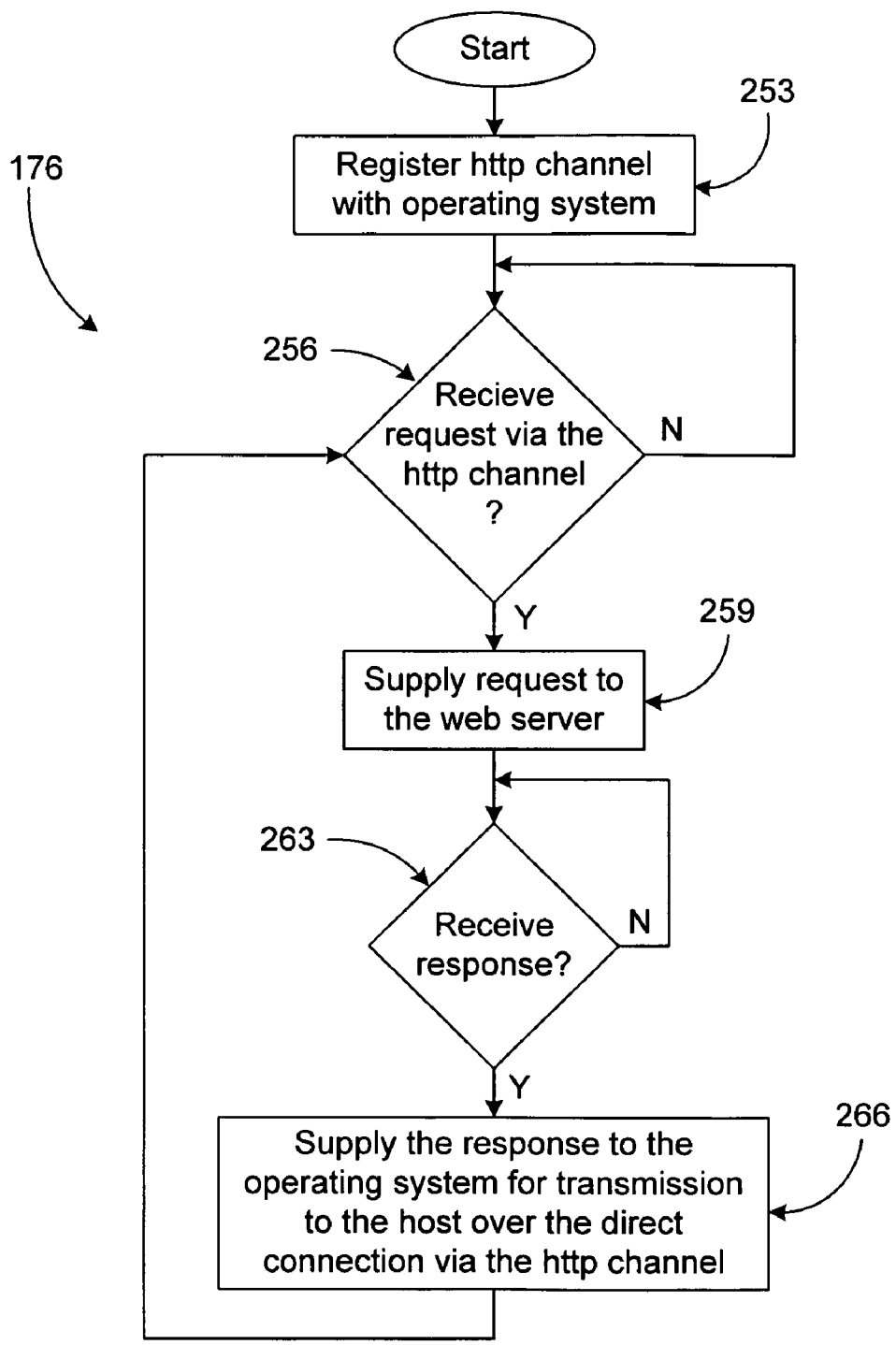
FIG. 3 is a flow chart of the logical function of a peripheral listener in a peripheral in the peripheral access system of FIG. 1.

With reference to FIG. 3, shown is a flowchart of the logic of the peripheral listener 176 according to another aspect of the present invention. Alternatively, the flow chart of FIG. 3 may be viewed as a number of steps performed within the peripheral 153. The peripheral listener 176 is stored on the memory 159 and executable by the processor 156 to bridge a communication gap between the operating system 173 and the web server 179. Beginning with block 253, the peripheral listener 176 registers the HTTP channel with the operating system 173. This is generally accomplished during startup of the peripheral 153 to ensure that the peripheral listener 176 receives all data traffic that is transmitted to the peripheral 153 destined for the web server 179. This assumes that other data traffic may be received by the peripheral 153 from the host 123 that is not destined for the web server 179. Such data traffic would be destined for other functions inherent in the operation of the peripheral 153 in conjunction with its relationship with the host 123. Such other traffic may be sent and received via other channels.

Once the HTTP channel is registered with the operating system 173 in block 253, then the peripheral listener 176 moves to block 256 in which it waits to receive a request by way of the HTTP channel from the host 123. The request would generally be received when the operating system 173 obtains the request and upon scrutiny of the channel identifier in the request, identifies that the request is to be provided to the peripheral listener 176 by virtue of the registration of the HTTP channel in block 253. Assuming that the request is received via the HTTP channel by the peripheral listener 176 from the operating system 173, then the peripheral listener 176 moves to block 259 in which the request is in turn supplied to the web server 179. Thereafter, in block 263, the peripheral listener 176 waits to receive a response from the web server 179. Assuming that a response is received in block 263, the peripheral listener 176 moves to block 266 in which the response is provided to the operating system 173 for transmission to the host 123 over the direct connection using the HTTP channel. Thereafter, the peripheral listener 176 reverts back to block 256 to wait for the next request to be received.

Referring back to FIG. 1, in addition to the forgoing, it should be noted that the functionality of the host listener 146 and the peripheral listener 176 may be incorporated into the respective operating systems 143 and 173.

Although the host and peripheral listeners 146 and 176 of the present invention are embodied in software as discussed above, as an alternative the host and peripheral listeners 146 and 176 may also be embodied in dedicated hardware or a combination of software and dedicated hardware. If embodied in dedicated hardware, the host and peripheral listeners 146 and 176 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein. Whether implemented in terms of software, dedicated hardware, or a.

The flow charts of FIGS. 2 and 3 show the architecture, functionality, and operation of an implementation of the host and peripheral listeners 146 and 176. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow charts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. It is understood that all such variations are within the scope of the present invention.

Also, the host and peripheral listeners 146 and 176 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the host and peripheral listeners 146 and 176 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for providing network access to a web server in a peripheral device, comprising the steps of:
    identifying a request from a client received by a host via a network to be forwarded to the web server located on the peripheral device locally coupled to the host;

forwarding the request from the host to the web server located on the peripheral device;

transmitting a response to the request from the web server located in the peripheral device to the host; and transmitting the response from the host to the client.

2. The method of claim 1, wherein the step of identifying a request received by the host to be forwarded to the web server further comprises the step of identifying a virtual socket identifier in the request that is associated with the web server.

3. The method of claim 1, wherein the step of forwarding the request from the host to the web server located on the peripheral device further comprises the steps of:

opening a connection from the host to the peripheral device on a channel dedicated to the web server; and transmitting the request from the host to the web server via the channel.

4. The method of claim 3, wherein the step of transmitting the request from the host to the web server via the channel further comprises the step of attaching a channel Identifier to the request that is associated with the channel.

5. The method of claim 3, further comprising the steps of:

waiting in the host for the response from the peripheral device; and closing the connection to the peripheral device.

6. The method of claim 1, wherein the step of identifying a request from a client received by a host via a network to be forwarded to the web server located on the peripheral device locally coupled to the host, further comprises the steps of:

registering a host listener with an operating system of the host to establish a virtual socket for a port dedicated to the web server located on the peripheral device; and listening on the virtual socket with the host listener to identify the request that is to be forwarded to the web server on the peripheral device when the request is received by the host from the client.

7. A system in a host for providing network access to a web server in a peripheral device, comprising:

a processor coupled to a local interface;

a memory coupled to the local interface; and listener logic stored on the memory and executable by the processor, the listener logic comprising:

logic to identify a request from a client received by the host via a network to be forwarded to the web server located on the peripheral device locally coupled to the host;

logic to forward the request from the host to the web server located on the peripheral device; and logic to transmit a response to the request from the host to the client, the response being received by the host from the web server located on the peripheral device.

8. The system of claim 7, wherein the logic to identify a request received by the host to be forwarded to the web server further comprises logic to identify a virtual socket identifier in the request that is associated with the web server.

9. The system of claim 7, wherein the logic to forward the request from the host to the web server located on the peripheral device further comprises the steps of:

logic to open a connection to the peripheral device on a channel dedicated to the web server; and logic to transmit the request to the web server via the channel.

10. The system of claim 9, wherein the logic to transmit the request from the host to the web server via the channel further comprises logic to attach a channel identifier to the request that Is associated with the channel.

11. The system of claim 9, wherein the listener logic further comprises:

logic in the host to wait for the response from the peripheral device; and logic to close the connection to the peripheral device.

12. The system of claim 7, wherein the logic to identify the request from the client received by the host via the network to be forwarded to the web server located on the peripheral device locally coupled to the host further comprises:

logic to register with an operating system of the host to establish a virtual socket for a port dedicated to the web server located on the peripheral device; and logic to listen on the virtual socket to identify the request that is to be forwarded to the web server on the peripheral device when the request is received by the host from the client.

13. A system for providing network access to a web server in a peripheral device, comprising:

means for identifying a request from a client received by a host via a network to be forwarded to the web server located on the peripheral device locally coupled to the host;

means for forwarding the request from the host to the web server located on the peripheral device;

means within the peripheral device for transmitting a response to the request from the web server to the host; and means within the host for transmitting the response received from the web server in the peripheral device to the client.

14. The system of claim 13, wherein the means for identifying a request received by the host to be forwarded to the web server further comprises means for identifying a virtual socket identifier in the request that is associated with the web server.

15. The system of claim 13, wherein the means for forwarding the request from the host to the web server located on the peripheral device further comprises:

means for opening a connection to the peripheral device on a channel dedicated to the web server; and means for transmitting the request to the web server via the channel.

16. The system of claim 15, wherein the means for transmitting the request to the web server via the channel further comprises means for attaching a channel identifier to the request that is associated with the channel.

17. A method in a peripheral device to provide access to a web server in the peripheral device from a network through a host, comprising:

receiving a request in the peripheral device, wherein the request was received by the host from the client via the network and the host identifies whether the request is to be forwarded to the web server in the peripheral device, the peripheral device being coupled to the host, and the host forwarding the request to the peripheral device if the host determines that the request is directed to the web server;

directing the request to the web server; and transmitting a response to the request from the web server to the host, wherein the host transmits the response received from the web server to the client via the network.

18. The method of claim 17, wherein the step of directing the request to the web server further comprises the steps of:

establishing a channel between the host and the peripheral device that is dedicated to the web server on the peripheral device; and directing the request received from the host via the channel to the web server.

19. A system in a peripheral device to provide access to a web server in the peripheral device from a network through a host, comprising:

a processor coupled to a local interface;

a memory coupled to the local interface; and peripheral listener logic stored on the memory and executable by the processor, the peripheral listener logic comprising:

logic to direct a request to the web server, wherein the request is received by the web server in the peripheral device, the request having been received by the host from the client via the network and, the host identifying whether the request is to be forwarded to the web server in the peripheral device, the peripheral device being coupled to the host, and the host forwarding the request to the peripheral device if the host determines that the request is directed to the web server; and logic to transmit a response to the request from the web server to the host, wherein the host transmits the response received from the web server to the client via the network.

20. The system of claim 19, wherein the logic to direct the request to the web server further comprises:

logic to establish a channel between the host and the peripheral device that is dedicated to the web server on the peripheral device; and logic to direct the request received from the host via the channel to the web server.

\* \* \* \* \*

UNITED STATES PATENT AND TRADEMARK OFFICE
CERTIFICATE OF CORRECTION

| | | |
|---|---|---|
| PATENT NO. | : 7,076,518 B1 | |
| APPLICATION NO. | : 09/695794 | |
| DATED | : July 11, 2006 | |
| INVENTOR(S) | : Roger S. Twede | |

It is certified that error appears in the above-identified patent and that said Letters Patent is hereby corrected as shown below:

On the title page, in Item (73), in "Assignee", in column 1, line 2, delete "Comapny" and insert -- Company --, therefor.

In column 7, line 20, in Claim 4, delete "Identifier" and insert -- identifier --, therefor.

In column 8, line 2, in Claim 10, delete "Is" and insert -- is --, therefor.

Signed and Sealed this
Twenty-fifth Day of January, 2011

David J. Kappos
*Director of the United States Patent and Trademark Office*